United States Patent Office 3,364,793
Patented Jan. 23, 1968

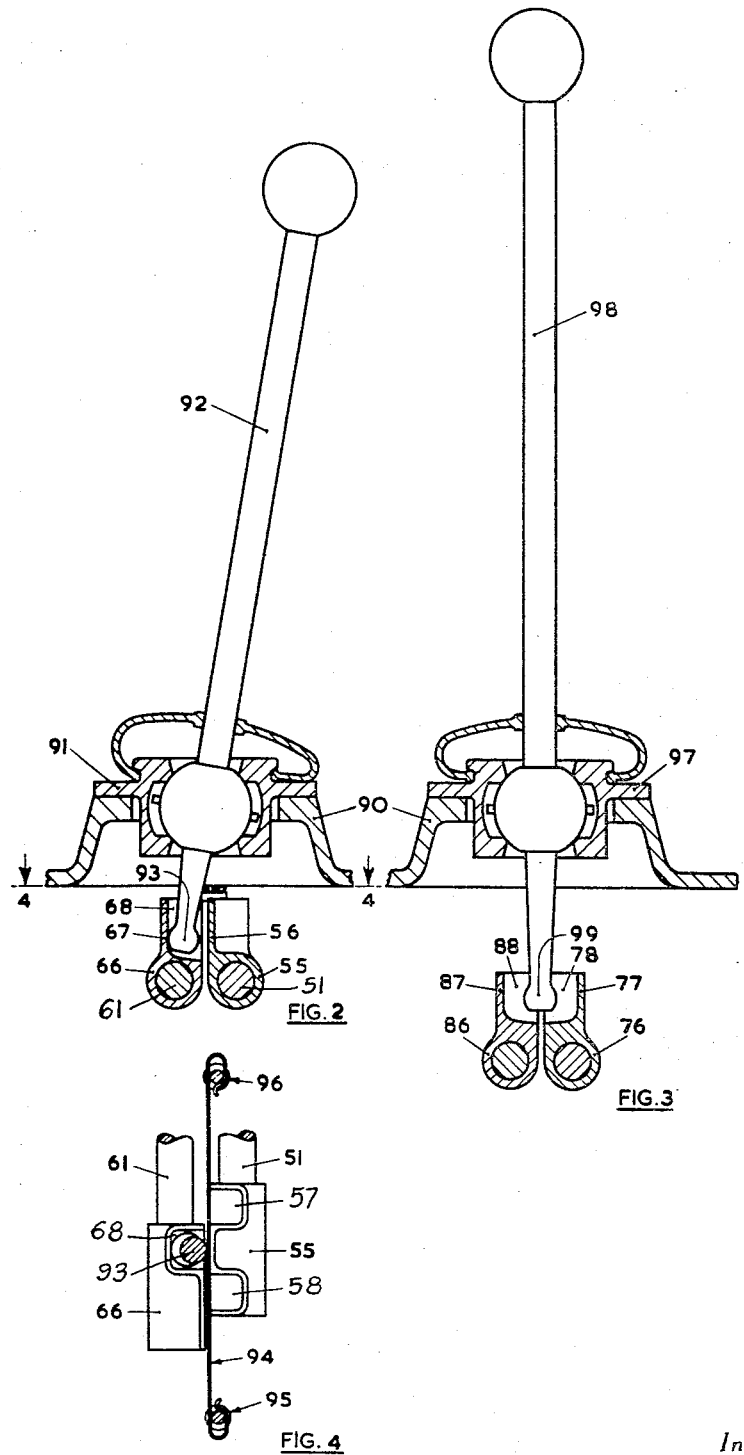

3,364,793
MULTI-RATIO TRANSMISSIONS
Thomas Eastwood, Huddersfield, England, assignor to David Brown Tractors Limited
Filed May 17, 1965, Ser. No. 456,072
Claims priority, application Great Britain, May 27, 1964, 21,873/64
6 Claims. (Cl. 74—745)

ABSTRACT OF THE DISCLOSURE

A gear change mechanism for multi-ratio transmissions having two, two-speed change gear assemblies in sequence, each assembly having a selector rod with the rods movable by a common gear selector lever to engage one gear ratio of one assembly and subsequently engage a gear ratio of the other assembly without disengaging the gear ratio first selected.

---

The invention relates to multi-ratio transmission mechanisms for vehicles.

It is known to provide, in combination, a gear mechanism capable of transmitting, selectively, a plurality of forward speeds and a reverse speed and controlled by a first gear lever, and a high and low range auxiliary gear mechanism controlled by a second gear lever. It is also known to add to such combination a normal and slow range auxiliary gear mechanism controlled by a third gear lever.

The object of the present invention is to reduce the number of gear levers required.

According to the invention, a multi-ratio transmission comprises two selector means movable by a single gear lever, one of said means being movable between its operative positions subsequent to movement of the other of said means into either of its operative positions. Preferably, the transmission comprises a first two-speed gear mechanism having a neutral position, a second two-speed gear mechanism having no neutral position, selector means for the first two-speed gear mechanism having a first slot engageable by a gear lever, and selector means for the second two-speed gear mechanism having spaced apart second and third slots located adjacent the first slot and also engageable by said lever.

A preferred embodiment of the invention will now be described, by way of example only, with reference to the accompanying drawings, of which:

FIG. 2 is a sectional view on line 2—2 in FIG. 1;

FIG. 3 is a sectional view on line 3—3 in FIG. 1; and

FIG. 4 is a sectional view on line 4—4 in FIG. 2.

Figure 1:
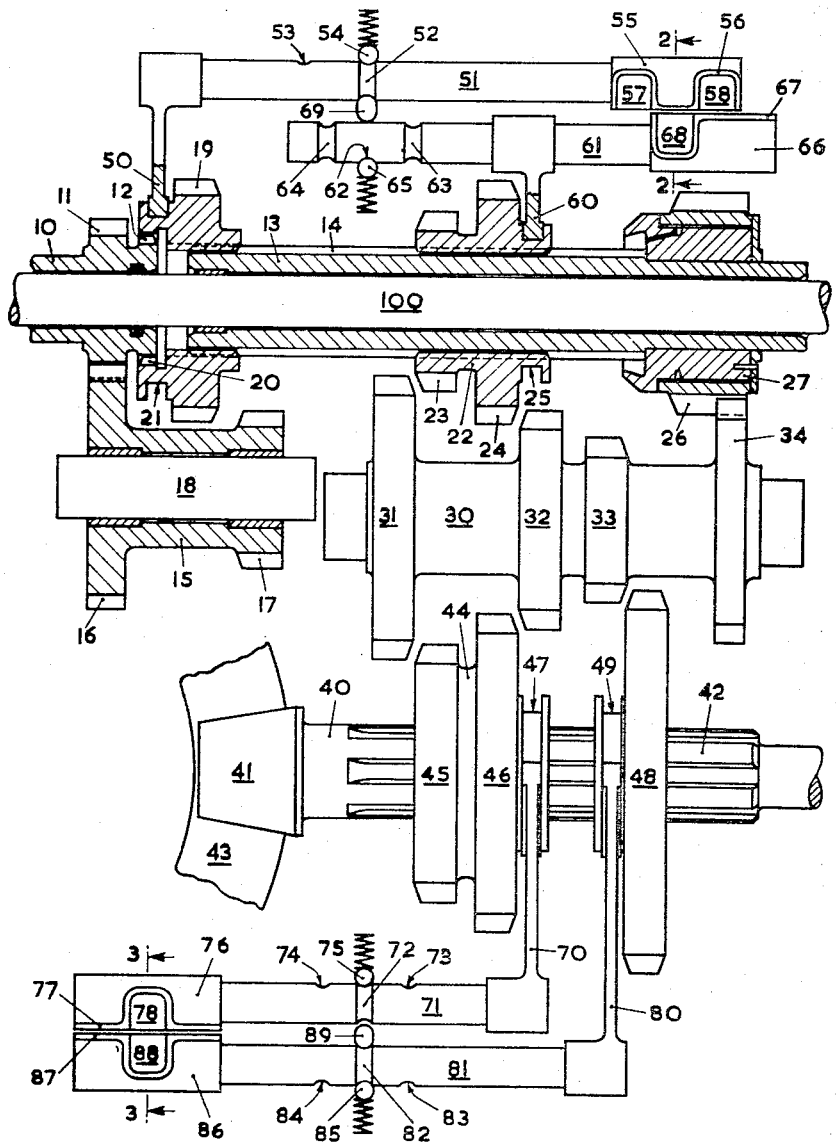
FIG. 1 is a diagrammatic view of a gearbox for an agricultural tractor.

Referring now to the drawings, a gearbox for an agricultural tractor comprises an input shaft 10, on which there are formed integrally a toothed gear 11 and external clutch teeth 12, mounted co-axially of an intermediate shaft 13 provided with external splines 14. A sleeve 15, on which there are formed integrally two toothed gears 16 and 17, is rotatably mounted on a dead shaft 18 parallel to the input and intermediate shafts, the gear 16 meshing constantly with the gear 11 on the input shaft 10. At that end of the intermediate shaft 13 adjacent the input shaft 10 there is slidably mounted a toothed gear 19 provided with internal clutch teeth 20. The gear 19 is movable between two positions in the first of which, see FIG. 1, its clutch teeth 20 engage with the clutch teeth 12 on the input shaft 10 and in the second of which it meshes with the gear 17 on the sleeve 15. The intermediate shaft 13 is therefore driven by the input shaft 10 either directly or at a reduced speed. The means described in this paragraph constitute a toothed gear mechanism having no neutral position which is capable of transmitting, selectively, a normal speed and a slow speed.

A layshaft 30, on which there are formed integrally four toothed gears 31, 32, 33 and 34, is mounted parallel to the intermediate shaft 13. Slidably mounted on the intermediate shaft 13 adjacent the gears 31 and 32 on the layshaft 30 is a hub 22 on which there are formed integrally two toothed gears 23 and 24. The hub 22 is movable between three positions, the first of which, see FIG. 1, is a neutral position, in the second of which the gear 23 meshes with the gear 31, and in the third of which the gear 24 meshes with the gear 32. The numbers of teeth on the gears 23, 24, 31 and 32 are such that the layshaft 30 is driven by the intermediate shaft 13 at either a reduced speed or an increased speed. The means described in this paragraph constitute a toothed gear mechanism having a neutral position which is capable of transmitting, selectively, a high speed and a low speed.

An output shaft 40, on which there is formed integrally a spiral bevel pinion 41, is mounted parallel to the layshaft 30. The output shaft 40 is provided with external splines 42 and the spiral bevel pinion 41 meshes constantly with a spiral bevel wheel 43. Slidably mounted on the output shaft 40 adjacent the gears 31 and 32 on the layshaft 30 is a hub 44, on which there are formed integrally two toothed gears 45 and 46. The hub 44 is movable between three positions, the first of which, see FIG. 1, is a neutral position, in the second of which the gear 45 meshes with the gear 31, and in the third of which the gear 46 meshes with the gear 32. A toothed gear 48 is also slidably mounted on the output shaft 40 adjacent the gear 33 on the layshaft 30. The gear 48 is movable between three positions, the first of which, see FIG. 1, is a neutral position, in the second of which is meshes with the gear 33, and in the third of which it meshes with a toothed gear 26 rotatably mounted on a hub 27 secured on the intermediate shaft 13. The gear 26 meshes constantly with the gear 34 on the layshaft 30. The numbers of teeth on the gears 31, 32, 33, 34, 45, 46 and 48 are such that the output shaft 40 is driven by the layshaft 30 at an increased speed, a reduced speed, a more reduced speed, and a reduced speed in the reverse direction. The means described in this paragraph constitute a toothed gear mechanism having a neutral position which is capable of transmitting, selectively, three forward speeds and one reverse speed.

The combination of the three toothed gear mechanisms herein before described, provides a gearbox for an agricultural tractor capable of transmitting, selectively, twelve forward speeds and four reverse speeds.

Movement of the gear 19 is controlled by a selector fork 50 which engages an annular groove 21 in said gear and is rigidly secured to an axially slidable rod 51 mounted parallel to the intermediate shaft 13. The rod 51 is provided with an annular groove 52 and an indent 53 which are engaged alternatively by a spring-loaded ball 54 to locate the gear 19 in either of its two positions hereinbefore described. A member 55, on which there is formed integrally a ridge 56 defining two slots 57 and 58, is rigidly secured to the rod 51.

Movement of the hub 22 is controlled by a selector fork 60 which engages an annular groove 25 in said hub and is rigidly secured to an axially slidable rod 61 mounted parallel to the intermediate shaft 13 and adjacent to the rod 51. The rod 61 is provided with an indent 62 and two annular grooves 63 and 64, which are engaged alternatively by a spring-loaded ball 65 to locate the hub 22 in any of its three positions hereinbefore described. A member 66, on which there is formed integrally a ridge 67 defining a slot 68, is rigidly secured to the rod 61 adjacent the member 55 on the rod 51. Mounted between the two rods 51 and 61, see FIG. 1, is a locking member 69 which is engageable selectively with the annular grooves 52, 63 and 64. Said locking member prevents simultaneous movement of the rods 51 and 61 but permits the rod 51 to be moved subsequent to movement of the rod 61 out of its neutral position into either of its operative positions. Thus changes can be made from normal to slow range and vice versa when either high or low range is engaged, but changes from high to low range and vice versa can only be made when normal range is engaged.

Movement of the hub 44 is controlled by a selector fork 70 which engages an annular groove 47 in said hub and is rigidly secured to an axially slidable rod 71 mounted parallel to the output shaft 40. The rod 71 is provided with an annular groove 72 and two indents 73 and 74, which are engaged alternatively by a spring-loaded ball 75 to locate the hub 44 in any of its three positions hereinbefore described. A member 76, on which there is formed integrally a ridge 77 defining a slot 78, is rigidly secured on the rod 71.

Movement of the gear 48 is controlled by a selector fork 80 which engages an annular groove 49 in said gear and is rigidly secured to an axially slidable rod 81 mounted parallel to the output shaft 40 and adjacent to the rod 71. The rod 81 is provided with an annular groove 82 and two indents 83 and 84, which are engaged alternatively by a spring-loaded ball 85 to locate the gear 48 in any of its three positions hereinbefore described. A member 86, on which there is formed integrally a ridge 87 defining a slot 88, is rigidly secured to the rod 81 adjacent the member 76 on the rod 71. Mounted between the two rods 71 and 81, see FIG. 1, is an axially slidable locking member 89 which is engageable selectively with the annular grooves 72 and 82. Said locking member prevents both of the rods 71 and 81 being moved out of their neutral positions concurrently.

Pivotally mounted on a cover 90 for the gearbox, by means of a spherical bearing 91, see FIG. 2, is a lever 92 provided with a part-spherical end portion 93. Said end portion is engageable in any of the slots 57, 58 and 68, but is normally held in engagement with the slot 68 by resilient means comprising a spring 94. Said spring, the ends of which are adapted to be supported by two studs 95 and 96 secured to the cover 90, see FIG. 4, is mounted adjacent to the member 66 and parallel to the rod 61 to which said member is rigidly secured. Also pivotally mounted on the cover 90, by means of a spherical bearing 97, see FIG. 3, is a lever 98 provided with a part-spherical end portion 99 which engages, selectively, either the slot 78 in the member 76 or the slot 88 in the member 86.

The input shaft 10 and the intermediate shaft 13 are sleeves through which a power take-off shaft 100 passes. The power take-off shaft 100 and the input shaft 10 are driven by the tractor engine (not shown) through co-axial disengageable friction clutches (not shown), and the spiral bevel wheel 43 drives the tractor rear axle halfshafts (not shown) through a differential gear mechanism (not shown).

In a modification, the disengageable friction clutch through which the tractor engine drives the power take-off shaft 100 is dispensed with and said shaft is driven by the input shaft 10, internal splines being formed within the input shaft 10 which engage with external splines formed on the power take-off shaft 100. The operation of the gearbox is as follows, it being assumed that the friction clutch for the input shaft 10 is disengaged and that it is desired to select the lowest of the twelve forward speeds: A force is applied to the lever 92 in that direction which causes the rod 61 to move to the left as viewed in FIG. 1 until the ball 65 engages the annular groove 63. The hub 22 is thus moved to that position in which the gear 23 meshes with the gear 31, and the slot 68 in the member 66 is aligned with the slot 57 in the member 55. The direction of the force is then changed to move the lever 92 against the action of the restraining spring 94. The end portion 93 of said lever is consequently disengaged from the slot 68 and engages the slot 57. The direction of the force is then changed once more to cause the rod 51 to move to the right as viewed in FIG. 1 until the ball 54 engages the indent 53. It is possible for the locking member 69 to be moved out of engagement with the annular groove 52 since the annular grove 63 has been moved into alignment therewith. Thus the gear 19 is moved to that position in which it meshes with the gear 17. The force applied to the lever 92 is then removed.

The lever 98 is now moved in that direction which causes its end portion 99 to engage the slot 88, see FIG. 3, and a force is applied to said lever in that direction which causes the rod 81 to move to the left as viewed in FIG. 1 until the ball 85 engages the indent 83. It is possible for the locking member 89 to be moved out of engagement with the annular groove 82 since the annular groove 72 is aligned therewith. Thus the gear 48 is moved to that position in which it meshes with the gear 33. The force applied to the lever 98 is then removed.

The friction clutch for the input shaft 10 is now engaged and the drive is transmitted to the output shaft 40 via the gears 11, 16, 17, 19, 23, 31, 33 and 48.

The other available speeds are obtainable by appropriate movement of one or both of the levers 92 and 98 whilst the friction clutch for the input shaft 10 is held disengaged. When the drive is transmitted from the layshaft 30 to the output shaft 40 via the gears 34, 26 and 48, the direction of rotation of the output shaft 40 is reversed.

What I claim is:

1. A multi-ratio transmission comprising means defining a first two-speed gear mechanism having a first member movable between gear ratio selecting positions, means defining a second two speed gear mechanism having a second member movable between gear ratio selecting positions, a first shiftable selector rod operatively connected to said first member, means providing a gear change selector lever engaging formation on said first rod, a second shiftable selector rod operatively connected to said second member, means providing two spaced gear change lever engaging formations on said second rod, a movably mounted gear change lever adapted for selective actuation of said rods, means providing for shift of said first rod between a neutral position and two operative speed ratio selecting positions, means providing for shift of said second rod only between two operative speed ratio selecting positions, said means providing for shift of said rods between said positions and said formations being so relatively arranged that when said second rod is in one of its said operative positions upon movement of said first rod into either of its said operative positions the formation on said first rod can be so aligned with one or the other of said formations on the second rod that said lever may be moved between operative engagement with the so aligned formations, and when said second rod is in the other of its said operative positions upon movement of said first rod into one of its said operative positions the formation on said first rod can be so operatively aligned with only one of the formations on said second rod that said lever may be moved between operative engagement with the so aligned formations.

2. A multi-ratio transmission as defined in claim 1, wherein resilient means is provided for restraining movement of said gear change lever from engagement with the formation on said first rod into engagement with said formations on the second rod until a predetermined force is applied to move said lever.

3. A multi-ratio transmission as defined in claim 1, including a power driven input shaft, and said second two-speed gear mechanism is operative to connect said first two-speed gear mechanism to said input shaft either directly or through speed reducing gearing.

4. A multi-ratio transmission as defined in claim 1, including control means for preventing both of said rods from being moved simultaneously while permitting said second rod to be moved after said first rod has moved out of its neutral position into either of its said operative positions.

5. A multi-ratio transmission as defined in claim 4, wherein said rods are parallel and slidably mounted and said control means comprises a locking member engaged with both rods and there being recesses in said rods cooperating with said locking member.

6. In the multi-ratio transmission defined in claim 1, said rods being slidably mounted and parallel and said formations being socket recesses on the respective rods open toward the other rod, and said gear change lever being pivoted with a projection for extending into said socket recesses.

References Cited
UNITED STATES PATENTS

| | | | |
|---|---|---|---|
| 2,388,763 | 11/1945 | Randol | 74—477 |
| 2,618,979 | 11/1952 | Benning | 74—745 |
| 2,690,684 | 10/1954 | Stemler | 74—477 |

DONLEY J. STOCKING, *Primary Examiner.*

H. S. LAYTON, *Assistant Examiner.*